Jan. 1, 1952
B. R. SHEPARD ET AL
2,581,209
MAGNETIC WIRE FOOTAGE METER
Filed Jan. 13, 1950
2 SHEETS—SHEET 1
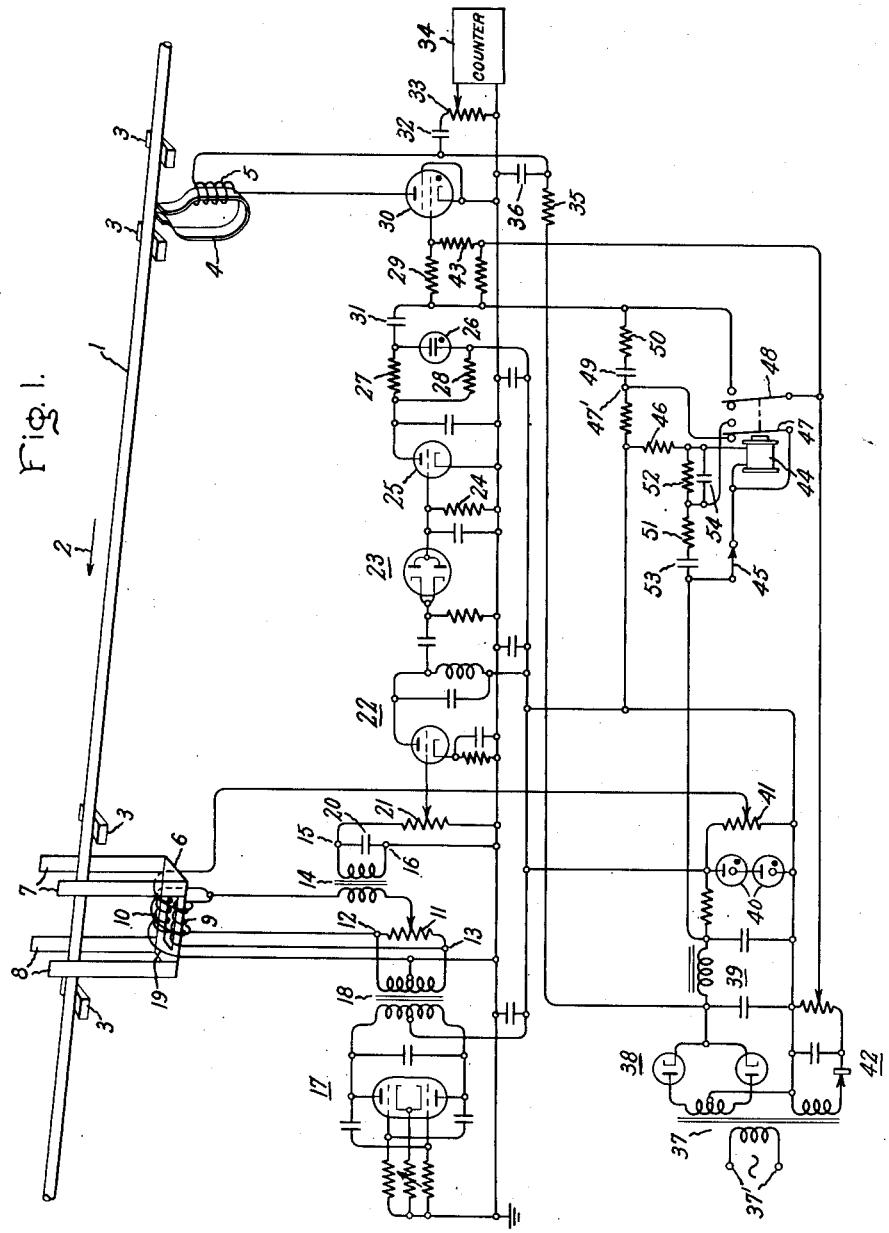
Inventors:
Billy R. Shepard,
Thomas T. Short,
by *Paul A. Frank*
Their Attorney.

Jan. 1, 1952     B. R. SHEPARD ET AL     2,581,209
MAGNETIC WIRE FOOTAGE METER
Filed Jan. 13, 1950     2 SHEETS—SHEET 2
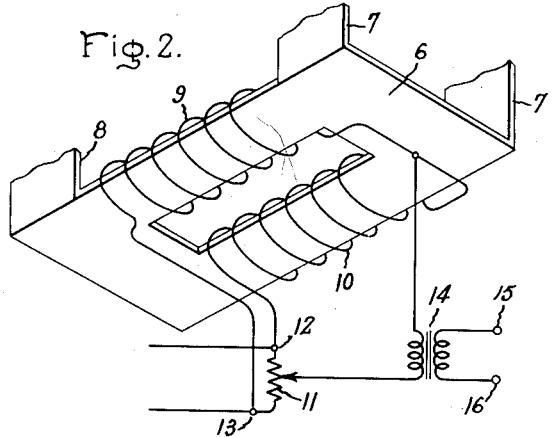
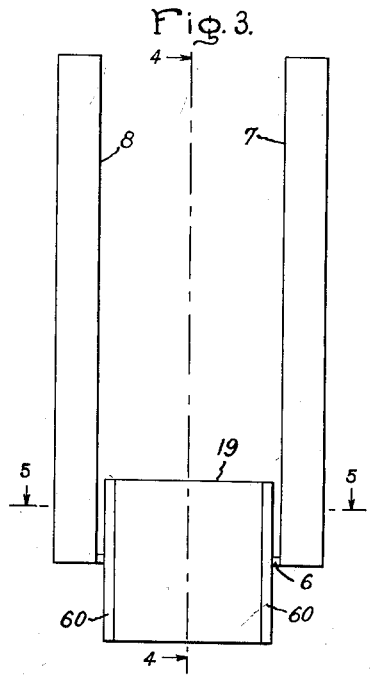
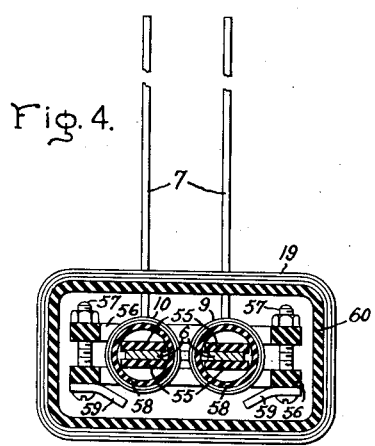
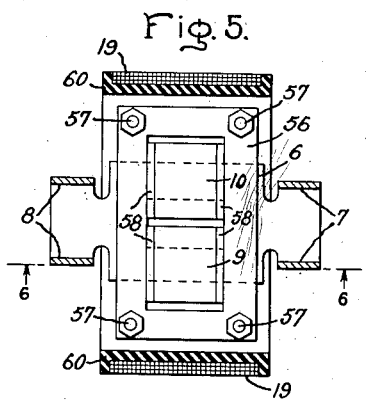
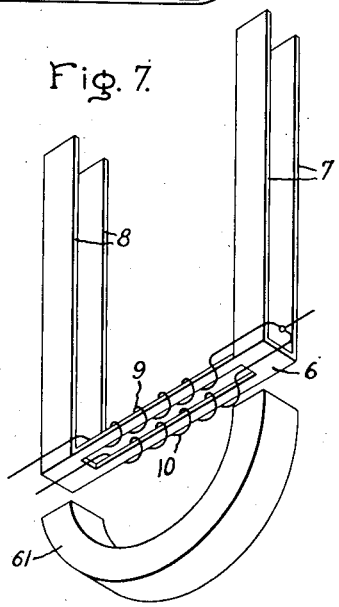
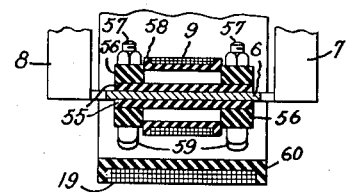
Inventors:
Billy R. Shepard,
Thomas T. Short,
by Paul A. Frank
Their Attorney.

Patented Jan. 1, 1952

2,581,209

UNITED STATES PATENT OFFICE 2,581,209

MAGNETIC WIRE FOOTAGE METER

Billy R. Shepard and Thomas T. Short, Schenectady, N. Y., assignors to General Electric Company, a corporation of New York Application January 13, 1950, Serial No. 138,498

5 Claims. (Cl. 175—183)

1

This invention relates to wire footage meters of the type in which successive magnetic marks are placed a predetermined distance apart along the length of the wire.

It has previously been suggested that footage measurements of a magnetizable material or wire in motion can be made with apparatus including electromagnetic marking means to place successive magnetic marks upon the wire, pickup means to detect these marks spaced a predetermined distance from the marking means along the direction of travel of the wire, and means whereby the pickup means actuates the marking means each time a mark is detected, so that the magnetic marks are evenly spaced a predetermined distance apart along the length of the wire. The marks so placed upon the wire may be counted in any convenient way, such as by conventional counting mechanism actuated by operation of the marking means, to provide a footage measurement.

Footage meters of this type, as previously proposed, operate satisfactorily only within a limited range of wire speeds. Those suitable for measuring wire traveling at low speeds do not operate satisfactorily at high speeds, and vice versa. For making wire footage measurements in industrial operations, for example, in measuring wire passing from a swift to a reel in a rewinding machine, it is desirable that the footage meter operate over a wide range of speeds, from very slow speeds of a few feet per minute, when the rewinding machine is first started, to very high speeds of four thousand feet per minute or more when the rewinding machine is operating at full speed.

An object of this invention is to provide an improved magnetic wire footage meter, the operation of which is substantially unaffected by speed of the wire over a very wide speed range.

Another object is to provide an improved magnetic wire footage meter in which the effects of vibration and non-uniformity of the wire have minimum effect upon the operation of the meter.

Other objects and advantages will appear as the description proceeds.

The features of this invention which are believed to be novel and patentable are pointed out in claims which form a part of this specification. For a better understanding of the invention, reference is made in the following description to the accompanying drawings, in which Fig. 1 is a schematic diagram of an improved magnetic wire footage meter; Fig. 2 is a partial schematic diagram of a portion of the pickup means; Fig. 3 is a side elevation of a preferred pickup means; Fig.

2

4 is a section along line 4—4, Fig. 3; Fig. 5 is a section along line 5—5, Fig. 3; Fig. 6 is a section along 6—6, Fig. 5; and Fig. 7 is a schematic perspective view of a modified pickup means.

Referring now to Fig. 1, the wire 1 to be measured travels past the footage meter in the direction indicated by arrow 2. Guide blocks 3, made of a hard wear-resisting material, are provided to keep the wire in its proper path. These guide blocks are the only parts of the meter which actually touch the wire, and therefore are the only parts subject to mechanical wear.

The marking means comprises a small electromagnet 4, the core of which preferably is constructed of one or two thin laminations of transformer iron bent into the shape shown, with an air gap of about one-eighth inch between its poles. On this core is a winding 5. The marking means is actuated by passing electric current through winding 5, which produces magnetic flux between the poles of the magnet. Part of this flux passes through wire 1 and places a magnetic mark upon the wire.

A pickup means is spaced from the marking means a predetermined distance, twenty-four inches for example, in the direction of travel of the wire. The pickup means comprises a magnetic member which has a two-legged saturable portion 6. At one end of portion 6 there is a pair of pole pieces 7, and at the other end a similar pair of pole pieces 8. Wire 1 passes between the two pole pieces 7 of one such pair, and then between the two pole pieces 8 of the other pair, as shown. When a magnetic mark upon the wire is between pole pieces 7 and 8, magnetic flux passes from the wire to one pair of pole pieces, through both legs of saturable portion 6, up the other pair of pole pieces, and back to the wire. Thus, as each magnetic mark moves by the pickup means, magnetic flux from the mark passes through the two legs of saturable portion 6. The magnitude of this flux is substantially independent of wire speed.

Two reactor windings, 9 and 10, are wound upon the respective legs of portion 6. Windings 9 and 10 are connected in series, and in respective arms of an alternating current bridge circuit, which also comprises a center-tap resistor 11 which forms the other two arms of the bridge circuit, input terminals 12 and 13 at the two ends of resistor 11, a transformer 14 having its primary connected between the tap of resistor 11 and the circuit junction of reactors 9 and 10, and output terminals 15 and 16 connected to the secondary of transformer 14.

The bridge circuit is better illustrated in Fig. 2. Referring now to this figure, alternating current is supplied to input terminals 12 and 13 as hereinafter explained. When there is no unidirectional magnetic flux through saturable portion 6 of the magnetic member, the impedance characteristics of reactors 9 and 10 are the same; and when the bridge is balanced by adjustment of the tap on resistor 11, there is no voltage across transformer 14 or between output terminals 15 and 16. It may be noted that windings 9 and 10 are so wound that the alternating magnetic flux of these windings is provided with a continuous path by portion 6 of the magnetic member, so that at any instant this magnetic flux passes in one direction through the leg upon which winding 9 is placed, and back in the other direction through the leg on which winding 10 is placed.

When a direct, i. e. unidirectional, magnetic flux passes from pole pieces 7 through portion 6 to pole pieces 8, this flux is of additive polarity to the alternating flux in one leg of portion 6, and thus increases the degree of saturation in that leg, and is of subtractive polarity to the alternating flux in the other leg, and thus decreases the degree of saturation in that leg. This causes the instantaneous impedance of one reactor winding, 9 for example, to be greater than that of the other reactor winding 10. During the next half-cycle of the alternating current supplied to the bridge, the situation is reversed and the instantaneous impedance of reactor 10 is greater than that of reactor 9. This change in the impedance characteristics of the reactor windings produces a second harmonic voltage across transformer 14, which is transmitted to output terminals 15 and 16.

Again referring to Fig. 1, alternating current is supplied to the input terminals of the bridge circuit by a conventional vacuum tube oscillator 17, preferably operating at a frequency of about ten kilocycles per second, through a transformer 18.

A bias coil 19 is wound about both legs of saturable portion 6, so that when direct current is passed through the bias coil a direct magnetic flux passes lengthwise through portion 6 in a direction opposite to that of the flux from magnetic marks on wire 1. In the preferred manner of operating the improved footage meter, the bias flux produced by coil 19 unbalances the bridge circuit and provides the maximum amplitude of second harmonic voltage between terminals 15 and 16 when there is no magnetic mark on wire 1 between pole pieces 7 and 8. Then, as a magnetic mark moves by the pickup means, and passes between the two pairs of pole pieces, flux from the magnetic mark opposes the flux produced by coil 19, and reduces the amplitude of the second harmonic voltage between terminals 15 and 16.

Preferably a capacitor 20 is connected in parallel with the secondary of transformer 14 to tune the secondary to the second harmonic frequency of twenty kilocycles. A load resistor 21 is also connected between terminals 15 and 16. Resistor 21 may have an adjustable tap, as shown, so that the amplitude of second harmonic voltage utilized to operate the following parts of the circuit may be adjusted to secure optimum operation.

The second harmonic voltage is amplified by a conventional vacuum tube amplifier 22 having a plate circuit tuned to the twenty kilocycle second harmonic frequency. The output of amplifier 22 is rectified by a rectifying circuit 23 to provide across resistor 24 a direct voltage having a magnitude proportional to the amplitude of second harmonic voltage at the bridge output terminals. This direct voltage has a maximum negative value when there is no magnetic mark between pole piece pairs 7 and 8, and a less negative value when such a mark is present between the two pairs of pole pieces.

The negative voltage across resistor 24 is applied to the grid of vacuum tube 25, so that when this voltage is maximum tube 25 conducts little if any current. In the plate circuit of tube 25 is a small neon glow tube 26 connected in series with the resistor 27 and in parallel with another resistor 28, as shown. Tube 26 is normally non-conductive, since the minimum amount of current conducted by tube 25 does not produce a sufficient voltage drop across resistor 28 to fire tube 26. When a magnetic mark on wire 1 passes into the space between the two pairs of pole pieces 7 and 8, the voltage across resistor 24 becomes less negative and tube 25 begins to conduct more current, thereby producing a larger voltage drop across resistor 28. When this voltage drop becomes sufficiently large, tube 26 fires and conducts current. This creates a sudden pulse of current through resistor 27, which causes the voltage at the circuit junction of resistor 27 and tube 26 to swing suddenly in the positive direction.

The positive voltage pulse is transmitted by capacitor 31 and resistor 29 to the grid of thyratron 30. This fires the thyratron, which actuates the marking means by causing current to flow through winding 5, and thus places another magnetic mark upon wire 1. Thus, each time a magnetic mark passes between pole piece pairs 7 and 8, the marking means places another mark upon the wire, so that magnetic marks are evenly spaced a predetermined distance apart along the length of the wire. Each time the marking means operates to place a mark upon the wire, a voltage pulse is transmitted through capacitor 32 and resistor 33 to a conventional pulse counter 34. By multiplying the number of pulses counted by the predetermined distance between pulses, one can determine the length of wire measured.

The circuit described is very fast acting, and is capable of making footage measurements at very high speeds which may exceed 4000 feet per minute. The same circuit can also operate at very low speeds, since the strength of signal provided by the pickup means is substantially independent of speed. Also, the effects of vibrations in the wire are minimized, since the pole pieces substantially surround the wire, and the vibrations have little effect upon the amount of flux which passes through the pickup.

To extinguish thyratron 30 after it has been fired, a resistor 35 is connected between the power supply and the plate of the thyratron, and a capacitor 36 is connected in parallel with the thyratron, as shown. When the thyratron is not conducting, capacitor 36 charges up to the full supply voltage. When the thyratron is fired, capacitor 36 delivers sufficient current to maintain conduction through thyratron 30 just long enough to place a magnetic mark on wire 1. Resistor 35 has a sufficiently high value that enough current cannot flow through the resistor to maintain conduction in the thyratron. Thus, as soon as the charge in capacitor 36 has been used up, the voltage at the plate of thyratron 30 falls to a low value, and the thyratron is extinguished.

Voltages for operating the circuit are provided by a conventional direct current power supply comprising a transformer 37 having a primary which may be connected through terminals 37 to a suitable source of alternating electric power, such as a commercial 60-cycle outlet. One secondary of transformer 37 is connected in a conventional full wave rectifier circuit 38 to which there is connected a conventional filter circuit 39 and voltage regulating means comprising two voltage regulator tubes 40 connected in series. In parallel with tubes 40 is a bleeder resistance 41 having an adjustable tap which is connected to bias winding 19 as shown. This provides an adjustable direct current through coil 19 to provide the bias magnetic flux hereinbefore described.

Another secondary of transformer 37 is connected in a conventional half-wave rectifier circuit 42 which provides a small negative bias voltage to the grid of thyratron 30 through resistor 43. This bias voltage prevents thyratron 30 from becoming conductive except when a positive pulse is applied to its grid through resistor 29.

A starting circuit is provided which comprises a relay 44 connected as shown. Operation of the meter is started by closing switch 45, which may be done by a relay operated by the winding machine in conjunction with which the footage meter is used. When switch 45 is closed, current flows from the power supply through switch 45, the coil of relay 44, and resistor 46 to ground. This energizes the relay and moves the relay contacts to their left-hand position, as illustrated in the drawing. As contact 47 closes to the left, the potential at circuit junction 47 is driven positive rapidly. This positive pulse is transmitted through capacitor 49, resistor 50, and resistor 29 to the thyratron grid, which fires the thyratron and places the first mark upon wire 1.

When the rewinding machine is stopped, switch 45 is opened and relay 44 is de-energized. The relay contacts then move to their right-hand position. In this position contact 48 completes a connection between resistor 29 and the bias voltage supply, so that thyratron 30 is prevented from firing and places no more marks upon wire 1.

If desired, a time delay circuit may be used to provide a short fixed time delay between the closing of switch 45 and the actuation of relay 44 which starts operation of the footage meter. This is provided by resistors 51 and 52 and capacitors 53 and 54, connected as shown. When switch 45 is open, relay contact 47 is closed to the right, capacitor 54 is discharged and capacitor 53 is charged to the power supply voltage. Capacitor 54 is then in parallel with relay 44. When switch 45 is closed, capacitor 54 must charge before sufficient voltage can build up to actuate relay 44.

Referring now to Figs. 3 through 6, which show a preferred construction of the pickup means, pole pieces 7 and 8 may be made of thin laminations of transformer iron bent into the shape shown. The two legs of portion 6 are thin strips of a metal having a high permeability, such as is generally used in making saturable reactors. At their ends, these strips are in contact with the pole piece laminations, so that a good magnetic circuit is provided. Strips of insulating material 55 lie parallel to strips 6. Two hollow rectangles of insulation 56, held together by screws 57 passing through their four corners, act as clamps to hold the assembly together. Windings 9 and 10 are wound upon insulating spools 58 which surround strips 6 and are held in place by the insulating strips 55. The ends of these coils are attached to terminals 59 to facilitate connection of the windings into the circuit. A larger insulating spool 60 fits loosely over coils 9 and 10, and on this spool is wound coil 19.

Instead of a winding to provide the bias magnetic flux, a permanent magnet may be used as is shown in Fig. 7. Referring now to this figure, a small permanent magnet 61 may be placed below saturable portion 6, with its poles beneath the respective ends of portion 6, as shown. Flux from the magnet passes from one end of portion 6 to the other. The magnitude of this bias flux can be adjusted by adjusting the distance between magnet 61 and portion 6 of the magnetic member.

Having described the principles of this invention and the best mode in which we have contemplated applying these principles, we wish it to be understood that the apparatus described is illustrative only, and that other means can be employed without departing from the true scope of the invention.

What we claim as new and desire to secure by Letters Patent of the United States is:

1. A footage meter for magnetizable material moving past the meter, comprising marking means for placing successive magnetic marks along the length of such material, pickup means spaced a predetermined distance from said marking means along the direction of travel of such material, said pickup means including a saturable magnetic member through which flux from each magnetic mark passes as such marks successively move by the pickup means, said pickup means also including two windings connected in series, each such winding being in magnetic flux-linking relation with said saturable magnetic member, means for supplying alternating current through said windings in series, so that direct magnetic flux passing through said pickup means produces a second harmonic potential at the circuit junction of said windings, which is altered in amplitude by passage of a magnetic mark by the pickup means, and means to actuate said marking means in response to such alterations in amplitude.

2. A footage meter for magnetizable material moving past the meter, comprising marking means for placing successive magnetic marks along the length of such material, a saturable magnetic member spaced a predetermined distance from said marking means along the direction of travel of such material, so that flux from each magnetic mark passes through the saturable magnetic member as such mark passes said member, a bridge circuit having input and output terminals, means to supply alternating current to the input terminals of said bridge circuit, said bridge circuit including two windings connected in respective arms of the bridge, said windings being in magnetic flux-linking relation with said saturable magnetic member and having opposite polarities with respect to flux passing through such member from the magnetic marks, whereby there is present at the output terminals of said bridge circuit a second harmonic voltage the amplitude of which is altered by passage of a magnetic mark by said magnetic member, means to actuate said marking means in response to such alterations in amplitude, whereby magnetic marks are evenly spaced a predetermined distance apart along such material, and means to count such magnetic marks.

3. A footage meter for magnetizable wire moving past the meter, comprising marking means for placing successive magnetic marks along the length of such material, pickup means spaced a predetermined distance from said marking means along the direction of travel of such material, and means for actuating said marking means each time a magnetic mark passes said pickup means, whereby such magnetic marks are evenly spaced a predetermined distance apart along the length of such material, characterized in that the pickup means comprises a magnetic member having a two-legged saturable portion and a pair of pole pieces at each end of such portion, said member being positioned so that the wire measured passes between the two pole pieces of one such pair and then between the two pole pieces of the other such pair, and windings on the respective legs of such saturable portion, whereby each magnetic mark passing the pickup means provides magnetic flux through the saturable portion of the pickup and thereby alters the impedance characteristics of said windings.

4. A footage meter for magnetizable material moving past the meter comprising marking means for placing successive magnetic marks along the length of such material, pickup means spaced a predetermined distance from said marking means along the direction of travel of such material, said pickup means including a saturable magnetic member through which flux from each magnetic mark passes as such marks successively move by the pickup means, said pickup means also including two windings connected in series, each such winding being in magnetic flux-linking relation with said saturable magnetic member; means for supplying alternating current through said windings in series, so that direct magnetic flux passing through said pickup means produces a second-harmonic potential at the circuit junction of said windings which is altered in amplitude by passage of a magnetic mark by the pickup means, rectifying means to provide a direct voltage related in value to the amplitude of such second-harmonic potential, and means to actuate said marking means in response to changes in value of such direct voltage.

5. A footage meter for magnetizable wire moving past the meter, comprising electromagnetic marking means for placing successive magnetic marks along the length of such wire, a magnetic member spaced a predetermined distance from said marking means along the direction of travel of such wire, said magnetic member having a two-legged saturable portion and a pair of pole pieces at each end of such portion, said magnetic member being positioned so that the wire measured passes between the two pole pieces of one such pair and then between the two pole pieces of the other such pair, so that flux from each magnetic mark passes through said saturable portion as such mark passes said magnetic member, means to provide a bias direct magnetic flux through said saturable portion in the opposite direction to flux from such marks, a bridge circuit having input and output terminals, oscillator means to supply alternating current to the input terminals of said bridge circuit, said bridge circuit including two reactor windings connected in respective arms of the bridge, said windings being respectively wound upon the two legs of said saturable portion, so that there is present at the output terminals of said bridge circuit a second harmonic voltage the amplitude of which is reduced by passage of a magnetic mark on the wire measured by said magnetic member, rectifying means to provide a direct voltage having a magnitude proportional to the amplitude of such second harmonic voltage, pulse-forming means to provide an electric pulse each time the magnitude of such direct voltage is reduced, means including a thyratron to actuate said marking means in response to each such electric pulse, and counting means actuated by operation of said marking means.

BILLY R. SHEPARD.
THOMAS T. SHORT.

REFERENCES CITED

The following references are of record in the file of this patent:

UNITED STATES PATENTS

| Number | Name | Date |
|---|---|---|
| 2,241,499 | Barth | May 13, 1941 |
| 2,332,797 | Hume | Oct. 26, 1943 |
| 2,412,046 | Hoare | Dec. 3, 1946 |
| 2,439,446 | Begun | Apr. 13, 1948 |
| 2,466,251 | Martin | Apr. 5, 1949 |
| 2,480,575 | Hare | Aug. 30, 1949 |
| 2,488,277 | Falk et al. | Nov. 15, 1949 |